United States Patent Office 3,557,237
Patented Jan. 19, 1971

3,557,237
PROCESS FOR PREPARING 1,4-SUBSTITUTED-1,3-BUTADIYNES
Chester E. Pawloski, Bay City, Mich., assignor to The Dow Chemical Company, Midland, Mich., a corporation of Delaware
No Drawing. Filed July 31, 1968, Ser. No. 748,975
Int. Cl. C07c 11/22, 11/28
U.S. Cl. 260—678                              10 Claims

ABSTRACT OF THE DISCLOSURE 1,4-substituted-1,3-butadiynes having the formula

R—C≡C—C≡C—R are made by a process comprising coupling compounds having the formula Br—C≡C—R where each R independently is alkyl, alkoxyalkyl, phenyl, phenoxyalkyl or phenalkoxyalkyl in the presence of a catalytic solution comprising an aqueous solution of CuBr and a non-metallic source of chloride or bromide ions. These 1,4-substituted-1,3-butadiynes are useful as chemical intermediates, fuels, e.g. in welding or cutting applications, and have biological activity.

BACKGROUND OF THE INVENTION

It is known that oxidative coupling of acetylene compounds occurs when the compounds are in the presence of an aqueous solution of a metallic salt, e.g. a copper salt, and at least one part of an inert, liquid, water-immiscible organic aromatic hydrocarbon compound, e.g. benzene, per fifty parts of reaction mixture, see U.S. Pat. No. 3,065,283.

SUMMARY OF THE INVENTION

It has now been found that 1,4-substituted-1,3-butadiynes having the formula

R—C≡C—C≡C—R are made by a process comprising coupling compounds having the formula Br—C≡C—R where each R independently is alkyl having up to ten carbon atoms (preferably alkyl having up to four carbon atoms, e.g. methyl or ethyl); alkoxyalkyl having up to ten carbon atoms (preferably alkoxymethyl or alkoxyethyl having up to six carbon atoms, e.g. methoxymethyl ethoxypropyl); phenyl phenoxyalkyl having up to twelve carbon atoms (preferably phenoxymethyl or phenoxyethyl) or phenalkoxyalkyl having up to twelve carbon atoms (preferably benzyloxymethyl or benzyloxyethyl), in the presence of a catalytic solution comprising an aqueous solution of CuBr and a non-metallic source of chloride or bromide ions. By practicing this invention, the need for the relatively large amounts of inert organic diluent in the reaction mixture, heretofore thought necessary for the reaction to occur, is avoided. Thus, a more economical route for 1,4-substituted-1,3-butadiyne production has been found.

In order to practice the invention, a compound having the formula Br—C≡C—R is reacted by contact, in any convenient manner, with a compound of the formula Br—C≡C—R while in the presence of a catalytic solution comprising an aqueous solution of CuBr and a non-metallic source of chloride or bromide ions. After reaction, typically in a period of about 1–6 days, the 1,4-substituted-1,3-butadiyne product is separated from the reaction mixture by conventional methods, e.g. filtration and/or distillation. For each mole of

R—C≡C—C≡C—R formed by the practice of the invention, equimolar amounts of a compound having the formula

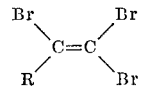

are produced.

Compounds of the formula Br—C≡C—R that are coupled to form their corresponding 1,4-substituted-1,3-butadiynes include 1-bromo-1-propyne, 1-bromo-1-butyne, 1-bromo-1-pentyne, 1-bromo-1-hexyne, 1-bromo-1-heptyne, 1-bromo-1-octyne, 1-bromo-1-decyne, 1-bromo-3-methyl-1-butyne, 1-bromo-3,3-dimethyl-1-butyne, 1-bromo-4-methyl-1-pentyne, 1-bromo-3-methyl-1-pentyne, 1-bromo-5-methyl-1-hexyne, 1-bromo-6-ethyl-1-heptyne, 1-bromo-7-methyl-1-octyne, 1-bromo-9-methoxy-1-nonyne, 1-bromo-8-ethoxy-1-octyne, 1 - bromo-7-propoxy-1-heptyne, 1-bromo-6-butoxy-1-hexyne, 1-bromo-5-pentoxy-1-pentyne, 1-bromo-4-hexoxy-1-butyne, 1-bromo-3-heptoxy-1-propyne, 1-bromo-3-methoxyl-1-propyne, 1-bromo-3-ethoxy-1-propyne, 1-bromo-2-phenylethyne, 1-bromo-6-phenoxy-1-hexyne, 1-bromo-5-benzyloxy-1-pentyne, 1-bromo-4-phenethoxy-1-butyne, 1-bromo-3-phenpropoxy-1-propyne, 1-bromo-3-phenoxy-1-propyne, 1-bromo-3-benzyloxy-1-propyne and 1-bromo-4-phenoxy-1-butyne. It is preferred to couple identical compounds, e.g. 1-bromo-1-propyne coupled with 1-bromo-1-propyne to give 2,4-hexadiene, but non-identical compounds are also coupled by practicing this invention, e.g. 1-bromo-1-propyne with 1-bromo-2-phenylethyne to give 5-phenyl-2,4-pentadiyne.

The catalytic solution used in this invention is an aqueous solution of CuBr and a non-metallic source of chloride or bromide ions. The chloride or bromide ions required for the catalytic solution can come from any source, i.e. the source of these ions is not critical so long as it is non-metallic, e.g. ammonium chloride, ammonium bromide, hydrogen chloride, hydrogen bromide and dimethylamine hydrochloride can be sources. The molar ratios of CuBr and the non-metallic source of chloride or bromide ions within the aqueous catalytic solution can vary widely and so long as each of the ingredients of the solution is present, their relative proportions are not important. Typically, at least 0.01 mole of CuBr and 0.01 mole of chloride or bromide ions are present per mole of Br—C≡—R. In general, it is desirable to have the aqueous catalytic solution comprise at least 1% of the reaction mixture, by volume. If desired, trace amounts of copper metal can be added to the catalytic solution, but the presence of copper metal is not critical to the invention.

It is ordinarily advantageous to conduct the coupling reaction at a temperature between 15 and 30° C., but temperature is not critical to the invention and the reaction will occur over a wide range of temperatures, e.g. between −10 and 200° C. and preferably between 5 and 90°. The coupling reaction can be conducted in the presence of an inert solvent, e.g. the lower aliphatic alcohols such as methanol, the chlorinated solvents such as carbon tetrachloride; but their presence is not necessary for practicing the invention.

The products of the reaction, i.e. the 1,4-substituted-1,3-butadiynes, are useful as fuels, e.g. they are useful as high energy fuels for air-breathing aircraft (due to their diacetylenic nature); they are also useful as a fuel in gas welding or cutting applications. In general, a diacetylenic compound, e.g. butadiyne, produces a higher flame temperature than a monoacetylenic compound, e.g. acetylene, when both are used in conjunction with oxygen in the normal gas cutting and welding situations. In addition, compounds produced by the present invention have biological activity, e.g. 2,4-hexadiyne is an active fungicide as is evidenced by the following experiment:

To an aqueous solution containing 25 parts of 2,4-hexadiyne per million parts of water was added *Rhizoctonia solani* in standard suspension form. This mixture was sealed and gently shaken for 24 hours, after which the mixture was plated in petri dishes with a nutrient agar. 100% control of *Rhizoctonia solani* was observed.

DESCRIPTION OF SPECIFIC EMBODIMENTS

Example 1

Into a glass bottle was placed 12.5 g. of 1-bromo-1-propyne; 3 g. of CuBr; 2 g. of $NH_4Br$; a trace amount of copper powder and 11 ml. of 10% HBr in water. This mixture was shaken for 5 days at room temperature to give 7 g. of a crude product. Analysis by infrared spectroscopy showed the solid phase to be 2,4-hexadiyne. The liquid phase was substantially 1,1,2-tribromo-1-propene.

Similar experiments using 13 g. of 1-bromo-1-propyne and conducting the reaction at room temperature are reported below in Table 1. The percent conversion is based upon 1-bromo-1-propyne. In each case, the product was the desired 2,4-hexadiyne and in equimolar amounts; 1,1,2-tribromo-1-propene.

TABLE 1

| Run No. | Catalyst | Time, days | Percent conversion |
|---|---|---|---|
| 2 | 3 g. CuBr, 11 ml. 10% HBr | 5 | 78 |
| 3 | 2 g. CuBr, 2 ml. 60% HBr | 7 | 38 |
| 4 | 3 g. CuBr, 10 ml. 1% HBr | 6 | 15 |
| 5 | 3 g. CuBr, 12 ml. 10% HCl | 5 | 100 |
| 6 | 3 g. CuBr, 10 ml. 36% HCl | 5 | 100 |
| 7 | 3 g. CuBr, 2 g. $NH_4Br$, 8 ml. $H_2O$ | 5 | 100 |
| 8 | 3 g. CuBr, 2 g. $NH_4Cl$, 8 ml. $H_2O$ | 6 | 100 |
| 9 | 3 g. CuBr, 2 g. dimethylamine hydrochloride, 8 ml. $H_2O$ | 6 | 100 |

Example 2

Into a glass bottle was placed 10 ml. of 1-bromopentyne, 3 g. of CuBr, 3 g. of $NH_4Br$ and 10 ml. of $H_2O$. This mixture was heated at 90° C. for 3 days to give 100% conversion, based on 1-bromopentyne, to the desired 1,4-dipropyl-1,3-butadiyne, and 1,1,2-tribromo-1-pentene.

Example 3

Into a glass bottle was placed 15 g. of 1-bromo-2-phenylethyne, 3 g. of CuBr, 3 g. of $NH_4Br$ and 10 ml. of $H_2O$. This mixture was heated at 90° C. for 2 days to give 12 g. of crude product. Analysis by infrared spectroscopy showed the crude product contained substantial amounts of 1,4 - diphenyl-1,3-butadiyne and 1,1,2- - tribromo-2-phenylethylene.

Example 4

Into a glass bottle was placed 4 g. of 1-bromo-3-phenoxy-1-propyne, 2 g. of $NH_4Br$, 2 g. of CuBr and 10 ml. of $H_2O$. This mixture was heated at 90° C. for 2 days to give 3.5 g. of crude product. Analysis by infrared spectroscopy showed the crude product to be substantially 1,6-diphenoxy-2,4-hexadiyne and 1,1,2-tribromo-3-phenoxy-1-propylene.

The starting materials for the coupling reaction, i.e. the compounds having the formula Br—C≡C—R, are readily made by a known process comprising adding the non-brominated starting compound corresponding to the brominated starting compound to a chilled aqueous solution of KOH and $Br_2$.

I claim:
1. A process for making a 1,4-substituted-1,3-butadiyne having the formula

R—C≡C—C≡C—R which comprises reacting by contacting a compound having the formula Br—C≡C—R with a compound having the formula Br—C≡C—R in the presence of a catalytic solution comprising an aqueous solution of CuBr and a non-metallic source of chloride or bromide ions where each R independently is alkyl having up to ten carbon atoms, alkoxyalkyl having up to ten carbons, phenyl, phenoxyalkyl having up to twelve carbon atoms or phenalkoxyalkyl having up to twelve carbon atoms.

2. A process as defined in claim 1 wherein the temperature is between −10 and 200° C.

3. A process as defined in claim 1 wherein the temperature is between 5 and 90° C.

4. A process as defined in claim 1 wherein each R independently is alkyl having up to four carbon atoms; alkoxymethyl or alkoxyethyl having up to six carbon atoms; phenyl; phenoxymethyl; phenoxyethyl; benzyloxymethyl or benzyloxyethyl.

5. A process as defined in claim 1 wherein each R independently is methyl, ethyl, methoxymethyl or ethoxyethyl.

6. A process as defined in claim 1 wherein the non-metallic source of chloride or bromide ions is ammonium chloride, ammonium bromide, hydrogen chloride, hydrogen bromide or dimethylamine hydrochloride.

7. A process as defined in claim 1 wherein the catalytic solution contains a trace amount of copper metal.

8. A process as defined in claim 1 wherein each R is the same.

9. A process as defined in claim 1 wherein the process is conducted in the presence of an inert solvent.

10. A process as defined in claim 1 where each R is methyl and the temperature is between 15 and 30° C.

References Cited

UNITED STATES PATENTS

| | | | |
|---|---|---|---|
| 3,065,283 | 11/1962 | Happel et al. | 260—678 |
| 2,942,014 | 1/1960 | Cameron | 260—410.6 |
| 3,300,456 | 1/1967 | Hay | 260—88.2 |

OTHER REFERENCES

Raphael: "Acetylenic Compounds in Organic Synthesis," 1955, p. 17.

DELBERT E. GANTZ, Primary Examiner

J. M. NELSON, Assistant Examiner

U.S. Cl. X.R.

260—654